US012488770B2

(12) United States Patent
Kwon et al.

(10) Patent No.: US 12,488,770 B2
(45) Date of Patent: Dec. 2, 2025

(54) DATA INTERFACE DEVICE AND METHOD OF DISPLAY APPARATUS

(71) Applicant: LG Display Co., Ltd., Seoul (KR)

(72) Inventors: Yong Chul Kwon, Paju-si (KR); Dong Won Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 410 days.

(21) Appl. No.: 17/974,237

(22) Filed: Oct. 26, 2022

(65) Prior Publication Data

US 2023/0206885 A1 Jun. 29, 2023

(30) Foreign Application Priority Data

Dec. 23, 2021 (KR) ........................ 10-2021-0186095

(51) Int. Cl.
*G09G 5/395* (2006.01)
*G09G 5/06* (2006.01)

(52) U.S. Cl.
CPC ............... *G09G 5/395* (2013.01); *G09G 5/06* (2013.01)

(58) Field of Classification Search
CPC ...... G09G 5/395; G09G 5/06; G09G 2330/06; G09G 2340/0428; G09G 2370/10; G09G 5/008; G09G 5/006; G09G 3/20; G09G 2320/0666; G09G 2330/021; G09G 3/3266; G09G 3/3275; G09G 2310/08
See application file for complete search history.

(56) References Cited

U.S. PATENT DOCUMENTS

| | | | | |
|---|---|---|---|---|
| 2009/0009590 | A1* | 1/2009 | Russell | H04N 13/341 348/E13.001 |
| 2012/0188460 | A1* | 7/2012 | Mau | G09G 5/001 348/E9.037 |
| 2015/0302822 | A1* | 10/2015 | Lee | G09G 3/2096 345/204 |
| 2016/0351099 | A1* | 12/2016 | Kim | G09G 3/2037 |
| 2018/0190238 | A1* | 7/2018 | Park | G09G 5/008 |
| 2020/0160811 | A1* | 5/2020 | Boev | G09G 5/026 |
| 2020/0209642 | A1* | 7/2020 | Lakshminarayanan | G09G 3/2018 |

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*

* cited by examiner

*Primary Examiner* — Jeff Piziali
(74) *Attorney, Agent, or Firm* — Birch, Stewart, Kolasch & Birch, LLP

(57) ABSTRACT

A device for controlling a data interface of a display apparatus, can include a timing controller to encode one data transfer packet including image data according to a pixel clock to output the one data transfer packet to an interface line, and a source driver to decode the one data transfer packet to recover the image data. Also, the image data includes first image data of a first color and second image data of a second color between a first delimiter signal having a first logic value and a second delimiter signal having a second logic value, a most significant bit of the first image data is closer to the first delimiter signal than a least significant bit of the first image data, and a most significant bit of the second image data is closer to the second delimiter signal than a least significant bit of the second image.

9 Claims, 16 Drawing Sheets

FIG. 4A

| DM1 | DM1 | R[0] | R[1] | R[2] | R[3] | R[4] | R[5] | R[6] | R[7] | R[8] | R[9] | W[0] | W[1] | W[2] | W[3] | W[4] | W[5] | W[6] | W[7] | W[8] | W[9] | DM2 | DM2 |
|---|---|---|---|---|---|---|---|---|---|---|---|---|---|---|---|---|---|---|---|---|---|---|---|
| 1 | 1 | 0 | 1 | 0 | 1 | 0 | 1 | 0 | 1 | 0 | 1 | 1 | 0 | 1 | 0 | 1 | 0 | 1 | 0 | 1 | 0 | 0 | 0 |

Number of transitions : 19

DATA INTERFACE DEVICE AND METHOD OF DISPLAY APPARATUS

CROSS-REFERENCE TO RELATED APPLICATIONS

This application claims priority to Korean Patent Application No. 10-2021-0186095 filed in the Republic of Korea on Dec. 23, 2021, the entirety of which is hereby incorporated by reference as if fully set forth herein.

BACKGROUND

Field of the Invention

The present disclosure relates to a data interface device and method of a display apparatus.

Discussion of the Related Art

As a screen resolution and a screen size of display apparatuses are becoming larger, a transfer amount of digital image data for displaying an image is also increasing. The digital image data is composed of a combination of '0's and '1's.

In transfer data, when a transfer amount of data is high, the number of transitions between '0' and '1' is increasing, and due to this, electromagnetic interference (EMI) and power consumption may increase.

For example, when repeatedly transferring large amounts of image data including many logical transitions with alternating patterns of zeros and ones (e.g., for large, high definition screens), these type of repeated switching of voltage levels can increase power consumption and cause undesirable electromagnetic interference (EMI) and noise.

SUMMARY OF THE DISCLOSURE

To overcome or address the aforementioned issues associated with the related art, the present disclosure can provide a data interface device and method of a display apparatus, which decreases the number of transitions of data when image data is transferred, thereby reducing EMI and power consumption.

To achieve these objects and other advantages and in accordance with the purpose of the disclosure, as embodied and broadly described herein, a data interface device of a display apparatus includes a timing controller configured to encode a 1 data transfer packet including image data of a plurality of colors according to a pixel clock to output the 1 data transfer packet to an interface line and a source driver configured to receive the 1 data transfer packet through the interface line and decode the 1 data transfer packet according to the pixel clock to recover the image data of the plurality of colors. The image data of the plurality of colors include first image data of a first color and second image data of a second color, which are arranged between a first delimiter signal having a first logic value and a second delimiter signal having a second logic value and each have a plurality of bits, a most significant bit of the first image data is arranged closer to the first delimiter signal than a least significant bit of the first image data, a most significant bit of the second image data is arranged closer to the second delimiter signal than a least significant bit of the second image data, and the least significant bit of the first image data and the least significant bit of the second image data are adjacent to each other.

In another aspect of the present disclosure, a data interface method of a display apparatus includes encoding a 1 data transfer packet including image data of a plurality of colors according to a pixel clock to output the 1 data transfer packet to an interface line and receiving the 1 data transfer packet through the interface line and decoding the 1 data transfer packet according to the pixel clock to recover the image data of the plurality of colors. The image data of the plurality of colors include first image data of a first color and second image data of a second color, which are arranged between a clock signal having a first logic value and a dummy signal having a second logic value and each have a plurality of bits, a most significant bit of the first image data is arranged closer to the clock signal than a least significant bit of the first image data, a most significant bit of the second image data is arranged closer to the dummy signal than a least significant bit of the second image data, and the least significant bit of the first image data and the least significant bit of the second image data are adjacent to each other.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 4A is a diagram illustrating the number of transitions of data when 2-color image data is transferred with an original logic value, in a comparative example;

DETAILED DESCRIPTION OF THE EMBODIMENTS

Figure 1:
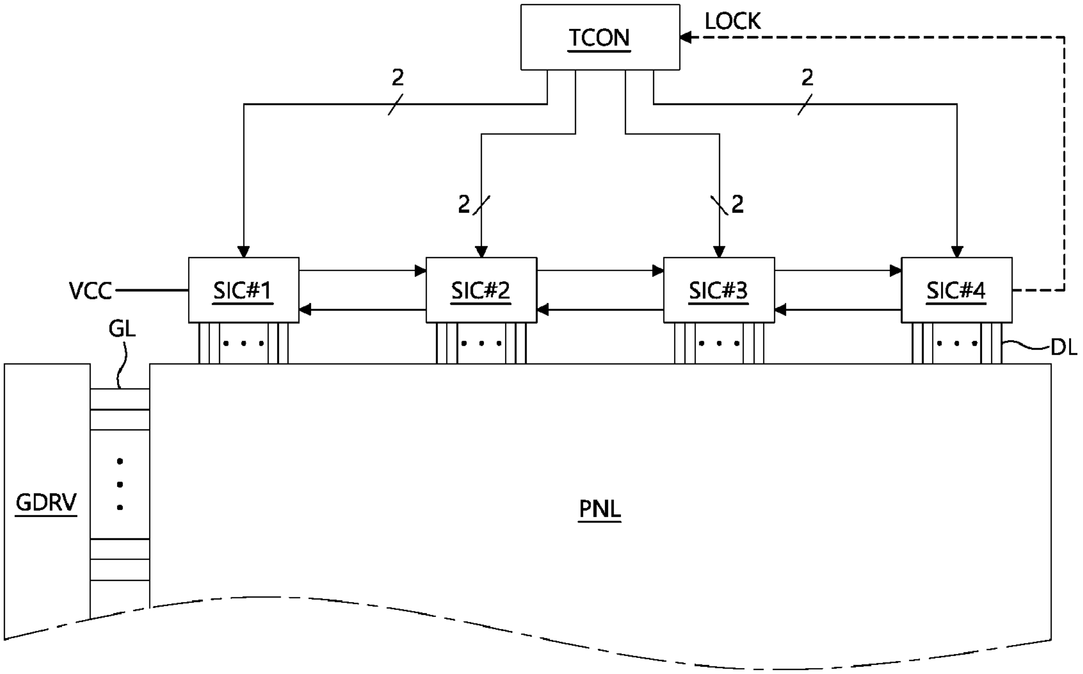
FIG. 1 is a diagram illustrating a display apparatus according to an embodiment of the present disclosure.

Hereinafter, the present disclosure will be described more fully with reference to the accompanying drawings, in which example embodiments of the disclosure are shown. The disclosure can, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely examples and the present disclosure is not limited thereto. Like reference numerals refer to like elements throughout. Throughout this specification, the same elements are denoted by the same reference numerals. As used herein, the terms "comprise," "having," "including" and the like suggest that other parts can be added unless the term "only" is used. As used herein, the singular forms "a," "an," and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~," "over~," "under~," and "next~," one or more other parts can be disposed between the two parts unless "just" or "direct" is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a diagram illustrating a display apparatus according to an embodiment of the present disclosure.

The display apparatus according to an embodiment of the present disclosure can be applied to flat panel display apparatuses, such as liquid crystal display (LCD) apparatuses, field emission display (FED) apparatuses, plasma display panel (PDP), organic light emitting display apparatuses, and inorganic light emitting display apparatuses, but is not limited thereto. The display apparatus according to an embodiment of the present disclosure can be applied to bendable display apparatuses, foldable display apparatuses, rollable display apparatuses, flexible display apparatuses, etc. The inventive concept can be applied to various display apparatuses including a timing controller TCON and a source driver SIC, which are connected to each other through an internal interface device. Hereinafter, an organic light emitting display apparatus will be described for example, but the inventive concept is not limited to the organic light emitting display apparatus.

Referring to FIG. 1, the display apparatus according to an embodiment of the present disclosure can include a display panel PNL, a timing controller TCON, a source driver SIC, and a gate driver GDRV.

The display panel PNL can include a pixel array which displays an input image. The pixel array can include a plurality of pixels which are arranged as a matrix type based on an intersection structure of a plurality of data lines DL and a plurality of gate lines GL. Each of the plurality of pixels can include a red (R) subpixel to which red image data is applied, a green (G) subpixel to which green image data is applied, a blue (B) subpixel to which blue image data is applied, and a white (W) subpixel to which white image data is applied, to implement colors.

Each of the subpixels can include a light emitting device, a driving element, a switching element, and a storage element. Internal compensation technology and external compensation technology can be applied for compensating for a driving characteristic deviation between subpixels in association with the light emitting device and/or the driving element (e.g., voltage threshold variations, mobility, OLED degradation, etc.). The internal compensation technology can compensate for a driving current flowing in the light emitting device by using a compensation circuit included in each subpixel, regardless of a characteristic variation of the driving element. In the external compensation technology, a sensing circuit disposed outside the display panel PNL can sense a driving characteristic variation of the light emitting device and/or the driving element of each subpixel, and a compensation circuit can correct image data which is to be applied to each subpixel, in order to compensate for the sensed driving characteristic variation.

The pixel array can further include a plurality of touch sensors, for implementing a touch user interface (UI). The touch sensors can each be implemented as a capacitive touch sensor which senses a touch input based on a variation of a capacitance before and after a touch is applied thereto, but are not limited thereto.

The timing controller TCON can receive digital image data and a timing signal, including a vertical synchronization signal, a horizontal synchronization signal, and a data enable signal, from a host system. The timing controller TCON can generate timing control signals for controlling an operation timing of the source driver SIC and an operation timing of the gate driver GDRV based on the timing signal. The timing control signals can include a source timing control signal for controlling the operation timing of the source driver SIC and a gate timing control signal for controlling the operation timing of the gate driver GDRV.

The timing controller TCON can be connected to the source driver SIC through a clock-embedded interface device based on a coding scheme based on a point-to-point scheme and can transfer a data transfer packet including a clock signal and image data RGBW to the source driver SIC.

The data transfer packet can be transferred to the source driver SIC through a transfer line. A pixel clock included in the data transfer packet can have only transition information to be recovered by a reception circuit, and thus, a clock-embedded type can be freer than a clock-split type in terms of a transfer limitation. A clock-embedded interface device can include a transfer circuit (EPI-Tx of FIG. 5), a transfer line, and a reception circuit (EPI-Rx of FIG. 5), the transfer circuit (EPI-Tx) can be embedded into the timing controller TCON, and the reception circuit (EPI-Rx) can be embedded into the source driver SIC.

The clock-embedded interface device can use a data coding scheme.

In the clock-embedded interface device based on the data coding scheme, the transfer circuit (EPI-Tx) can encode scrambled image data RGBW based on the pixel clock and can transfer an encoded data transfer packet to the reception circuit (EPI-Rx) through a plurality of transfer lines. The clock-embedded interface device can transfer a clock training pattern signal and a control data packet to the reception circuit (EPI-Rx) through the plurality of transfer lines before transferring the data transfer packet. The clock training pattern signal may be needed for a clock training operation of the reception circuit (EPI-Rx). The gate timing control signal and the source timing control signal described above can be coded and can be further included in the control data packet. The coded gate timing control signal and the coded source timing control signal can be decoded by the reception circuit (EPI-Rx).

The reception circuit (EPI-Rx) can include a CDR circuit. The CDR circuit can receive the clock training pattern signal through the transfer line and can track the clock training pattern signal to recover the pixel clock embedded in the data transfer packet. The reception circuit (EPI-Rx) can decode the data transfer packet based on the pixel clock recovered by the CDR circuit and can descramble decoded data to recover the image data RGBW.

The source driver SIC can include the reception circuit (EPI-Rx) and a digital-to-analog converter. The reception circuit (EPI-Rx) can supply the digital-to-analog converter with the source timing control signal and the image data RGBW recovered to be synchronized with the pixel clock. The digital-to-analog converter can convert digital image data RGBW into analog gamma compensation voltages (e.g., data voltages) based on the source timing control signal and can output the data voltages to data lines DL. The data voltages output to the data lines DL can be applied to subpixels in synchronization with a scan signal supplied to gate lines GL. Furthermore, the source driver SIC can supply the gate timing control signal, recovered by the reception circuit (EPI-Rx), to the gate driver GDRV through a separate signal line.

The gate driver GDRV can generate the scan signal which swings between a gate on voltage and a gate off voltage, based on the gate timing control signal. The gate on voltage can be a voltage for turning on a switching element of each subpixel, and the gate off voltage can be a voltage for turning off the switching element of each subpixel. The gate driver GDRV can sequentially or non-sequentially output the scan signal to the gate lines GL to select subpixels, into which data voltages are to be charged, by line units.

In a situation where the clock-embedded interface device is implemented based on an EPI, the timing controller TCON can convert each of a data transfer packet including the digital image data RGBW, the clock training pattern signal, and Rx control data into a difference signal pair based on a predetermined signal transfer standard in an EPI protocol and can serially transfer the difference signal pair to source drivers SIC #1 to SIC #4 through a data line pair (e.g., a transfer line). When the data transfer packet is transferred in the form of the difference signal pair, electromagnetic interference (EMI) can be easily reduced.

In order to decrease the number of transfer lines, image data of a plurality of colors (for example, R and W or G and B) can be included in a 1 data transfer packet. In this situation, in order to reduce EMI and the number of transitions of data, a bit array of image data of a first color and a bit array of image data of a second color can be constituted to be opposite to each other in the 1 data transfer packet. Also, in order to reduce EMI even further and the number of transitions of data, upper bits of image data can be transferred with being substituted into a first logic value '1' or a second logic value '0' under a specific condition. In this situation, image data where upper bits thereof are substituted into specific logic values can be indicated through indication data further included in the 1 data transfer packet. In the 1 data transfer packet, the indication data can be divided for each of a plurality of colors.

When a lock signal LOCK input through a lock feedback signal line has a low logic level, the timing controller TCON can transfer the clock training pattern signal to the source drivers SIC #1 to SIC #4, and when the lock signal LOCK is inverted into a high logic level, the timing controller TCON can start to transfer the Rx control data and the data transfer packet. The lock signal LOCK fed back to the timing controller TCON can be inverted into a low logic level only when a clock recovery circuit output of each of the source drivers SIC #1 to SIC #4 is unlocked, and thus, the stability of an interface operation can be secured.

The source drivers SIC #1 to SIC #4 can operate to satisfy the EPI protocol. Particularly, the source drivers SIC #1 to SIC #4 can decode the indication data of the data transfer packet supplied from the timing controller TCON, and thus, a substituted logic value corresponding to each of upper bits of color-based image data RGBW can be recovered to an original input logic value.

Figure 2:
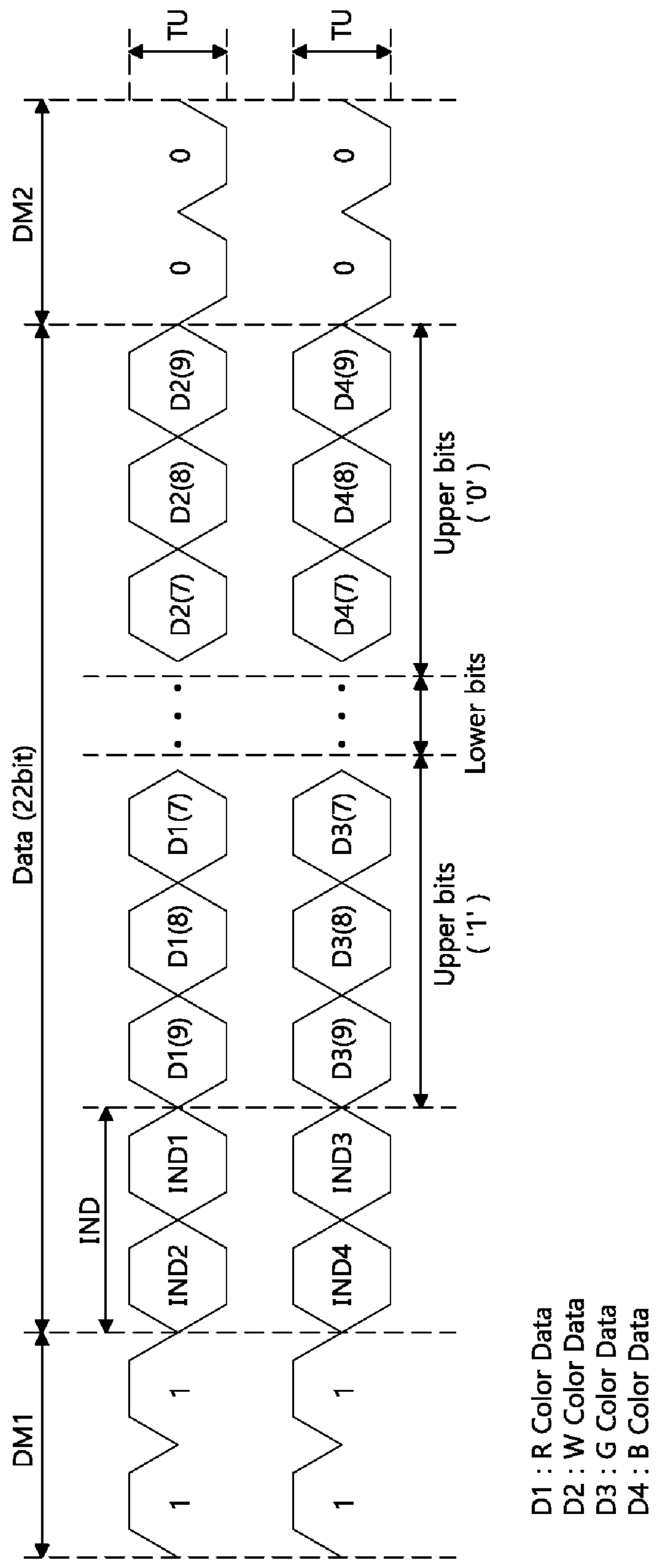
FIG. 2 is a diagram illustrating a configuration example of four-color data transfer packets for decreasing the number of transitions of data of transferred image data according to an embodiment of the present disclosure.

FIG. 2 is a diagram illustrating a configuration example of four-color data transfer packets for decreasing the number of transitions of data of transferred image data.

Referring to FIG. 2, a 1 data transfer packet TU can be composed of image data of a plurality of colors arranged between a first delimiter signal DM1 having a first logic value '1' and a second delimiter signal DM2 having a second logic value '0'.

The first delimiter signal DM1 having the first logic value '1' and the second delimiter signal DM2 having the second logic value '0' can be differentiation signals which define the 1 data transfer packet TU.

The image data of the plurality of colors can be composed of image data of a first color and image data of a second color. The image data of the first color and the image data of the second color can be differently selected from among R, W, G, and B image data D1, D2, D3, and D4. For example, the R and W image data D1 and D2 can be included in a 1 data transfer packet TU, and the G and B image data D3 and D4 can be included in another 1 data transfer packet TU. Each of the R, W, G, and B image data D1, D2, D3, and D4 can be composed of a plurality of bits (for example, 10 bits).

A bit array D(0) to D(9) of the image data of the first color (hereinafter referred to as first image data) and a bit array D(0) to D(9) of the image data of the second color (hereinafter referred to as second image data) can be constituted to be opposite to each other in the 1 data transfer packet TU (e.g., the bit array for the first color and the bit array for the second color can be arranged with their least significant bits D(0) at a center of the transfer packet TU).

For example, a most significant bit (MSB) D1(9) of first image data D1 can be arranged closer to the first delimiter signal DM1 than a least significant bit (LSB) D1(0) of the first image data D1, but an MSB D2(9) of second image data D2 can be arranged closer to the second delimiter signal DM2 than an LSB D2(0) of the second image data D2 and the LSB D1(0) of the first image data D1 can be adjacent to the LSB D2(0) of the second image data D2 (e.g., the least significant bits from the first and second image data are both arranged around the center of the transfer packet TU, see FIG. 2). Based on such a configuration, the number of transitions of data can be reduced, and EMI and power consumption can decrease.

In a plurality of pixels operating based on the same scan signal, a probability that upper bits of image data of the same color to be supplied to pixels adjacent to one anther have the same logic value can be high. For example, when a first pixel is adjacent to a second pixel, logic values of upper bits corresponding to each other can be the same in R image data which is to be supplied to an R subpixel of the first pixel and R image data which is to be supplied to an R subpixel of the second pixel. In the following description, "upper bits" can denote several upper bits including an MSB among a total of bits, and "lower bits" can denote several lower bits including an LSB among a total of bits. The number of bits included in the "upper bits" and the number of bits included in the "lower bits" can vary based on the total number of bits and a design spec.

Because the data interface device according to the present embodiment is based on a serial transfer scheme, image data of the same color to be supplied to adjacent pixels can be included in different data transfer packets TU and sequentially transferred. Therefore, in a situation (hereinafter referred to as a specific condition) where logic values of upper bits are the same in the image data of the same color, image data of the same color transferred in a lower priority can be processed so that logic values of upper bits have a first logic value '1' or a second logic value '0' which differs from an original logic value, the logic values of the upper bits can be transferred together with indication information about the performance or not of processing, thereby more decreasing the number of transitions of data.

In the present embodiment, first indication data IND1 and second indication data IND2 arranged between the first delimiter signal DM1 and the first image data D1 in the 1 data transfer packet TU can be the indication information about the performance or not of processing.

Upper bits of the first image data D1 can be relatively close to the first delimiter signal DM1 having the first logic value '1', and thus, can be processed to have the first logic value '1' in association with setting of the first logic value '1' of the first indication data IND1 under the specific condition, thereby increasing or maximizing an effect of reducing the number of transitions of data.

Moreover, upper bits of the second image data D2 can be relatively close to the second delimiter signal DM2 having the second logic value '0', and thus, can be processed to have the second logic value '0' in association with setting of the first logic value '1' of the second indication data IND2 under the specific condition, thereby increasing or maximizing an effect of reducing the number of transitions of data.

In this situation, the first indication data IND1 can be arranged adjacent to the MSB D1(9) of the first image data D1, and the second indication data IND2 can be arranged adjacent to the first delimiter signal DM1, thereby increasing or maximizing an effect of reducing the number of transitions of data.

The source driver can decode a data transfer packet TU based on the pixel clock, a logic value obtained by processing each of the upper bits of the first image data D1 can be recovered to an original logic value with reference to the first image data D1 (e.g., image data of the same color transferred in a higher priority) corresponding to a previous clock.

Furthermore, when logic values of upper bits in image data of the same color to be supplied to adjacent pixels differ, because it is impossible to recover the logic value to an original logic value by using the source driver, "logic value processing" performed by the timing controller can be omitted, and the image data can be intactly transferred to the source driver.

Figure 3:
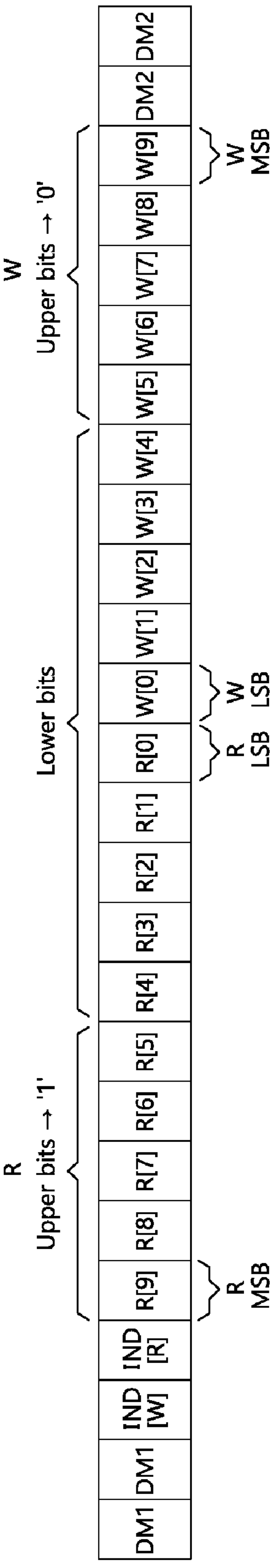
FIG. 3 is a diagram illustrating a configuration example of a 1 data transfer packet including 2-color image data according to an embodiment of the present disclosure.

FIG. 3 is a diagram illustrating a configuration example of a 1 data transfer packet including 2-color image data (e.g., the image data for two subpixels, here a red subpixel and a white subpixel).

Referring to FIG. 3, the first image data D1 and the second image data D2 illustrated in FIG. 2 can each be 10-bit R image data R(0) to R(9) and 10-bit W image data W(0) to W(9). Also, the first indication data IND1 illustrated in FIG. 2 can be "IND(R)," and the second indication data IND2 illustrated in FIG. 2 can be "IND(W)."

An MSB R(9) of the R image data can be arranged closer to the first delimiter signal DM1 than an LSB R(0) of the R image data, but an MSB W(9) of the W image data can be arranged closer to the second delimiter signal DM2 than an LSB W(0) of the W image data, and the LSB R(0) of the R image data and the LSB W(0) of the W image data can be adjacent to each other (e.g., the LSB for each subpixel can be arranged around a center of the 1 data transfer packet).

First indication data IND(R) can be arranged adjacent to the MSB R(9) of the R image data, and second indication data IND(W) can be arranged adjacent to the first delimiter signal DM1.

When the R image data R(0) to R(9) satisfy the specific condition, upper bits R(5) to R(9) of the R image data R(0) to R(9) and the first indication data IND(R) can be encoded to all have a first logic value '1'.

When the W image data W(0) to W(9) satisfy the specific condition, upper bits W(5) to W(9) of the W image data W(0) to W(9) and the first indication data IND(W) can be encoded to all have a second logic value '0'.

Figure 4B:
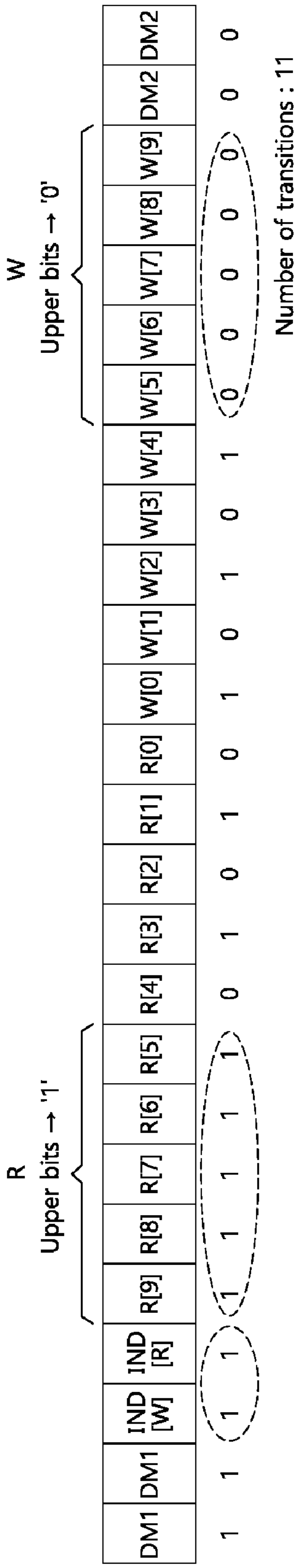
FIG. 4B is a diagram illustrating the number of transitions of data when a logic value of each of upper bits of 2-color image data is processed based on a predetermined condition and transferred, in an embodiment of the present disclosure.

FIG. 4A is a diagram illustrating the number of transitions of data when 2-color image data is transferred with an original logic value, in a comparative example of the present disclosure. FIG. 4B is a diagram illustrating the number of transitions of data when a logic value of each of upper bits of 2-color image data is processed based on a predetermined condition and transferred, in an embodiment of the present disclosure.

Referring to FIG. 4A, the comparative example can be an example where R image data and W image data each having a bit value "0101010101" are included in a first data transfer packet. According to the comparative example, the number of transitions of data of the 1 data transfer packet can be 19.

Referring to FIG. 4B, an embodiment can be an example where R image data and W image data each having a bit value "0101010101" are included in a first data transfer packet and can be an embodiment where logic values of upper bits of the R image data is substituted into '1' and logic values of upper bits of the W image data is substituted into '0', under a specific condition. According to the embodiment, the number of transitions of data of the 1 data transfer packet can be 11 and can decrease by about 42% compared to the comparative example of FIG. 4A. For example, if a specific condition exists where the original logic values of the image data for a subpixel are an alternating pattern of zeros and ones as "0101010101" then this specific pattern of high transitions can be identified and replaced with l's to avoid transitions, and then decoded later.

Figure 5:
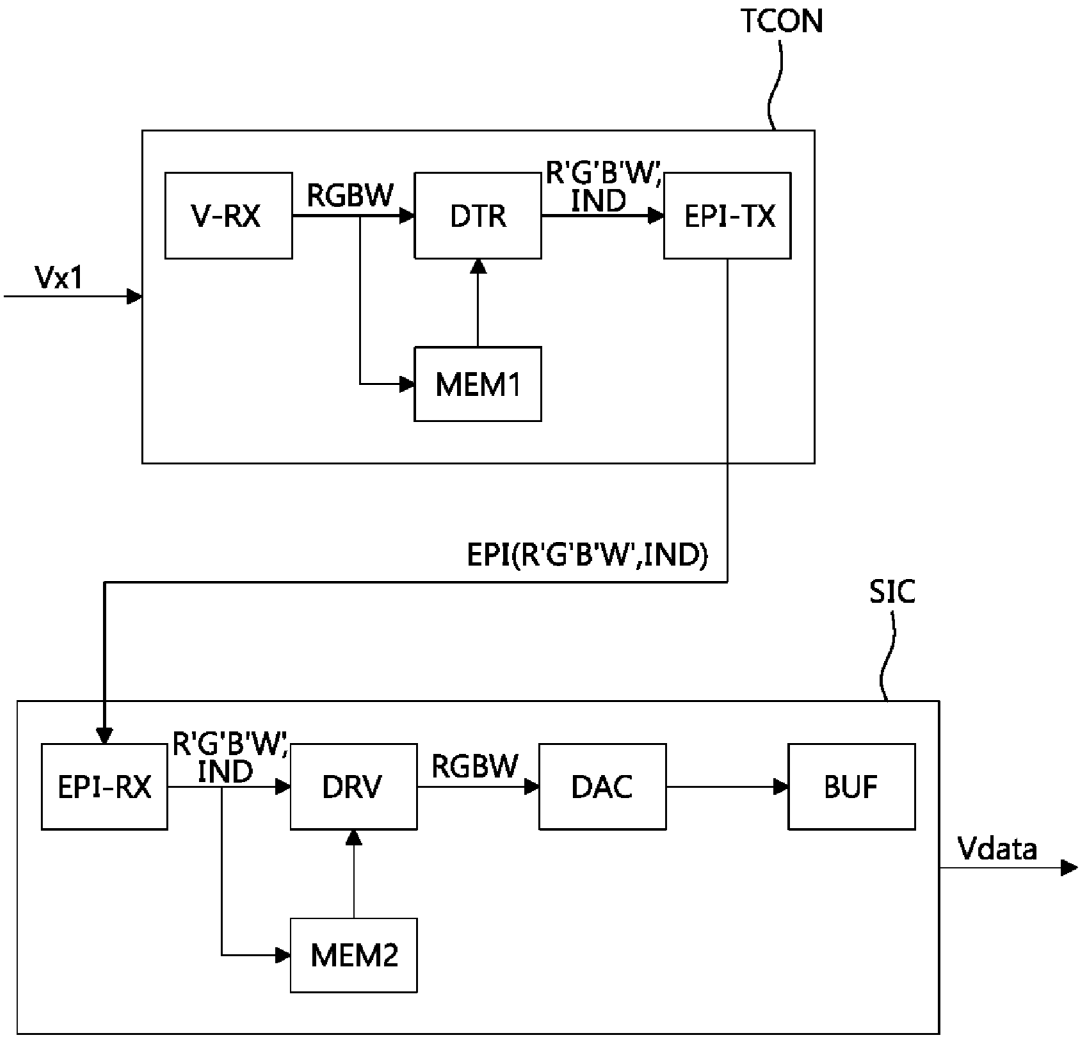
FIG. 5 is a diagram illustrating a configuration of each of a timing controller and a driver integrated circuit for processing 4-color data transfer packets to decrease the number of transitions of data according to an embodiment of the present disclosure.
Figure 6:
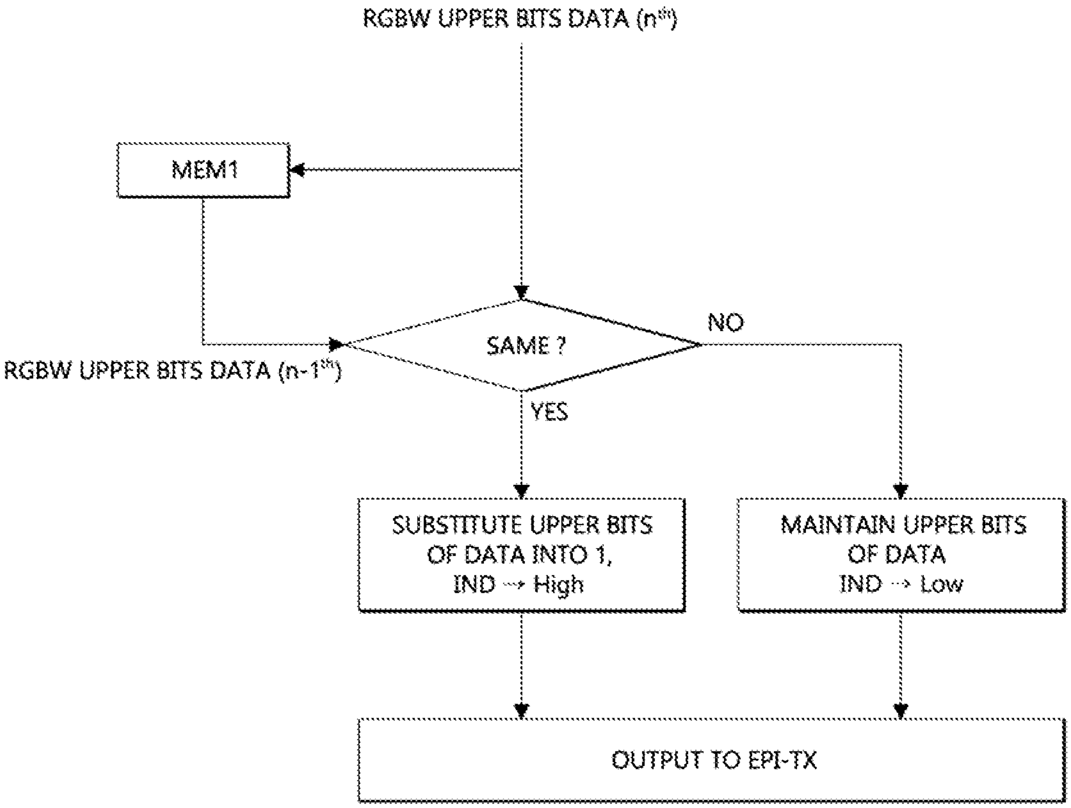
FIG. 6 is a diagram illustrating an operation of a data conversion circuit included in the timing controller of FIG. 5 according to an embodiment of the present disclosure.
Figure 7A:
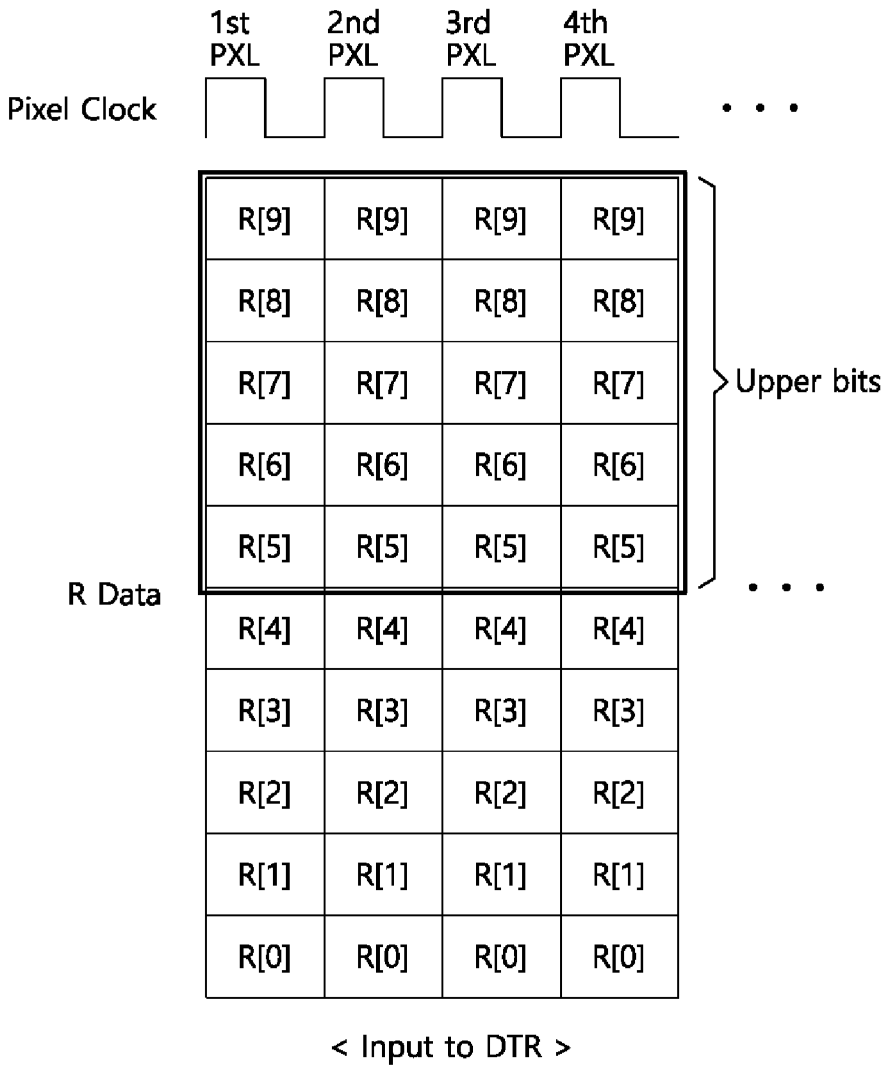
FIGS. 7A and 7B are diagrams illustrating an input and an output of each data conversion circuit according to an embodiment of the present disclosure.
Figure 7B:
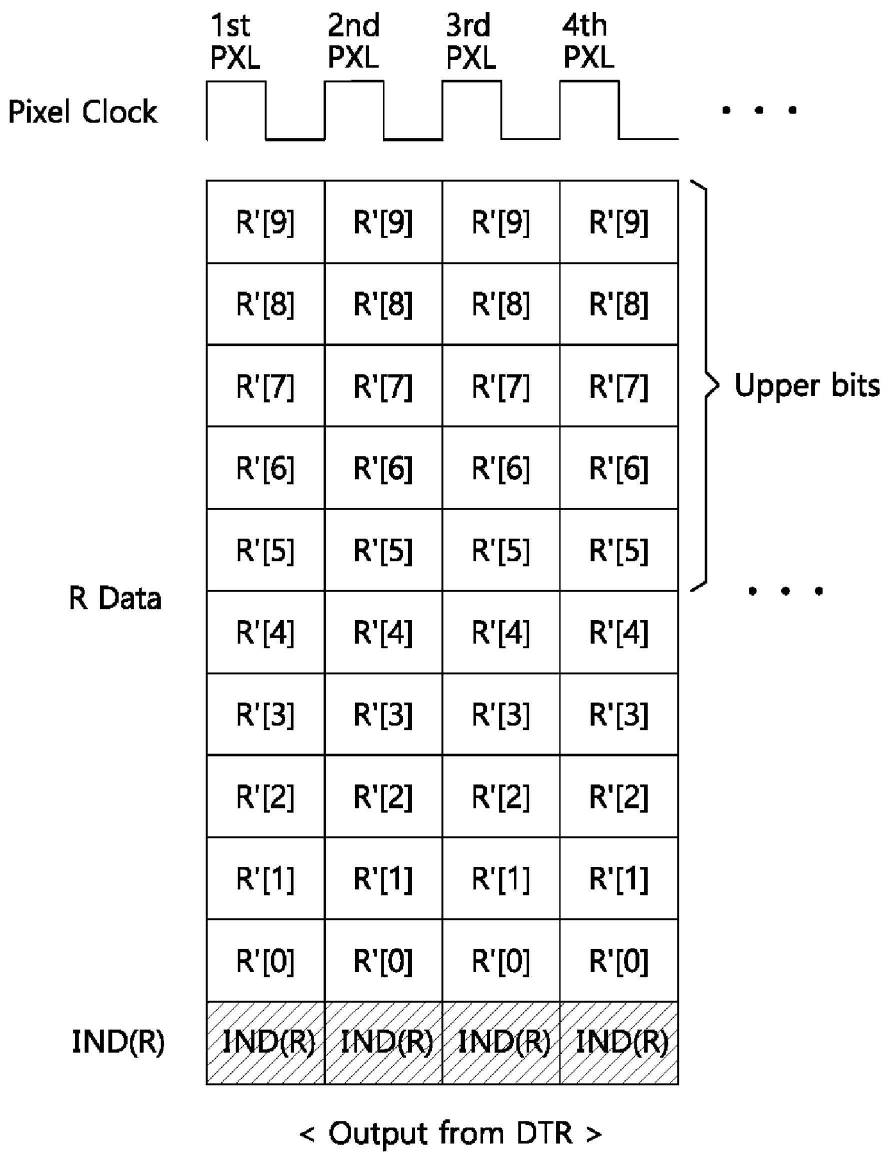
Figure 8A:
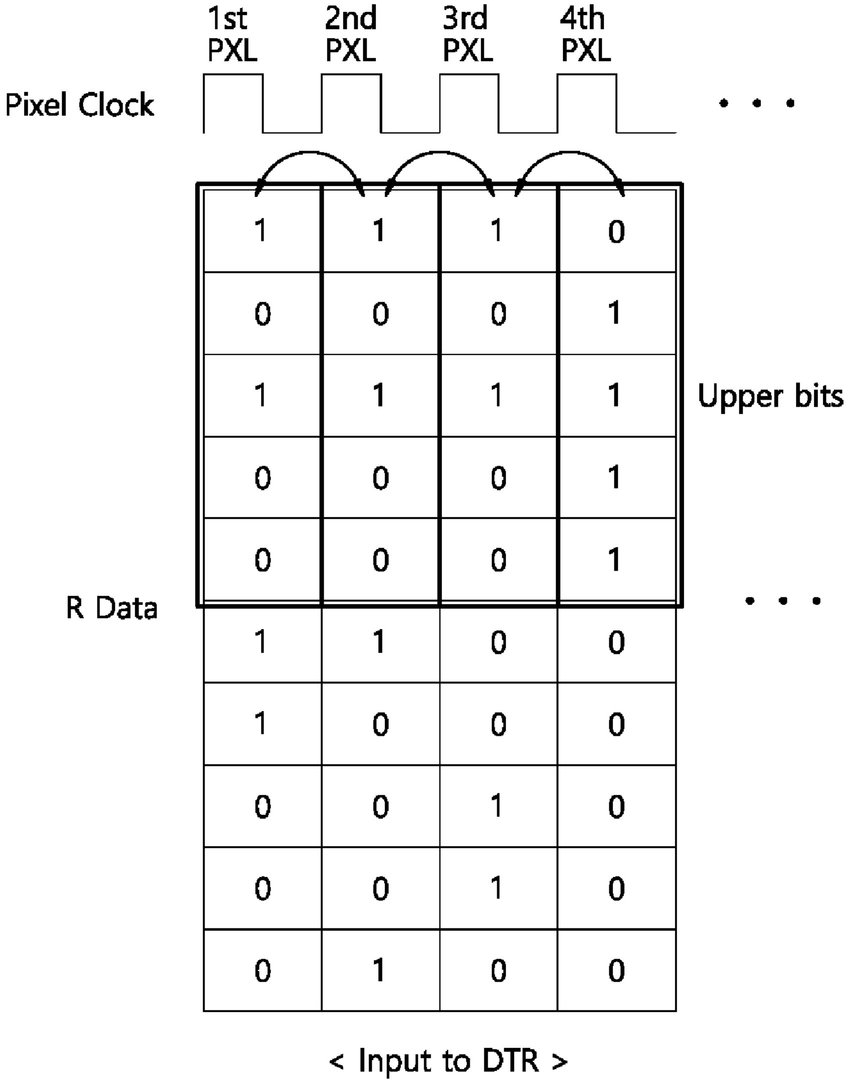
FIGS. 8A and 8B are diagrams illustrating a real example of an input and an output of each data conversion circuit according to an embodiment of the present disclosure.
Figure 8B:
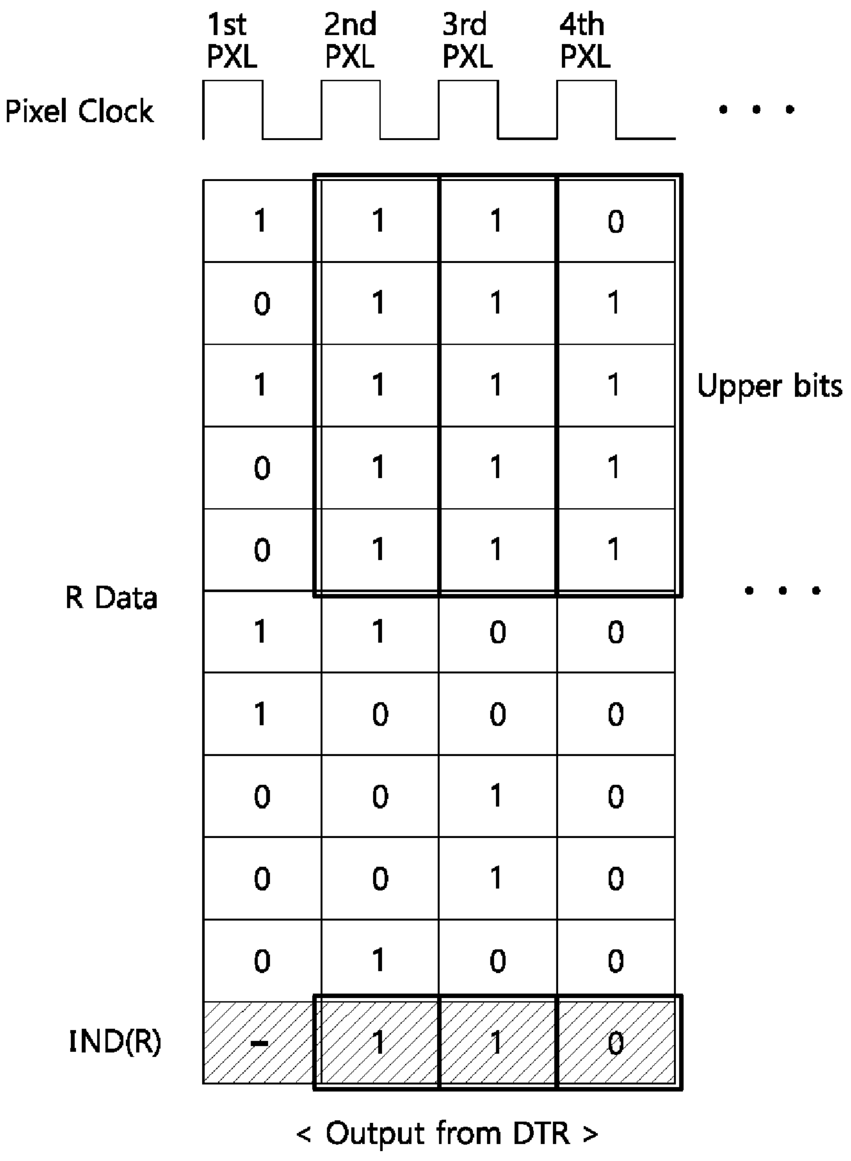
Figure 9:
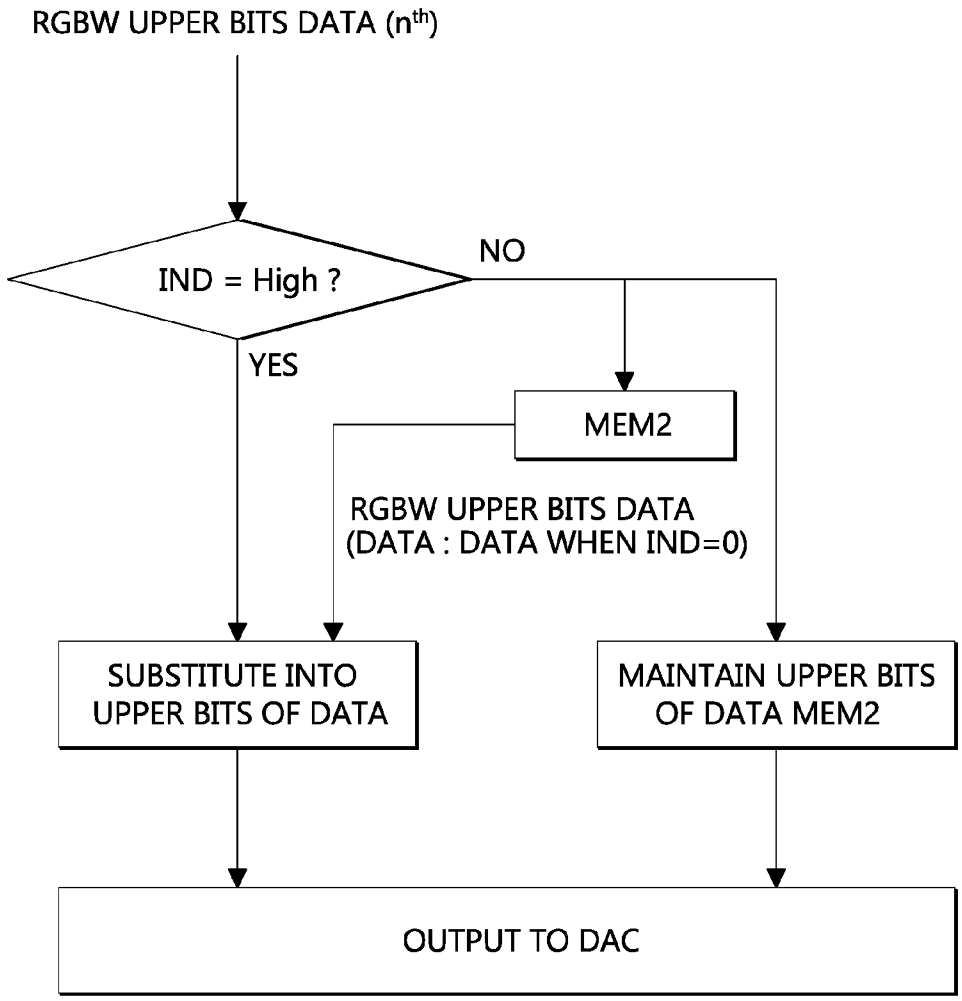
FIG. 9 is a diagram illustrating an operation of a data recover included in the driver integrated circuit of FIG. 5 according to an embodiment of the present disclosure.
Figure 10A:
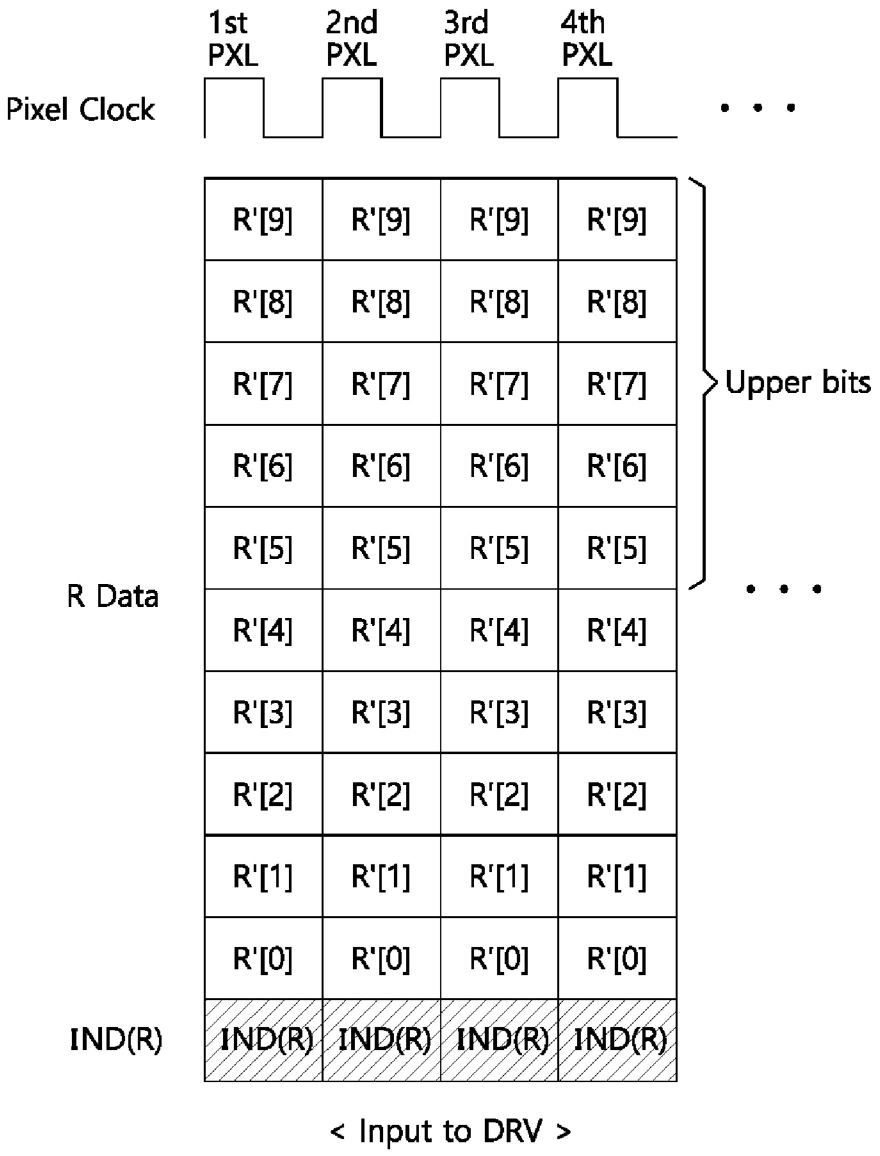
FIGS. 10A and 10B are diagrams illustrating an input and an output of each data recover according to an embodiment of the present disclosure.
Figure 10B:
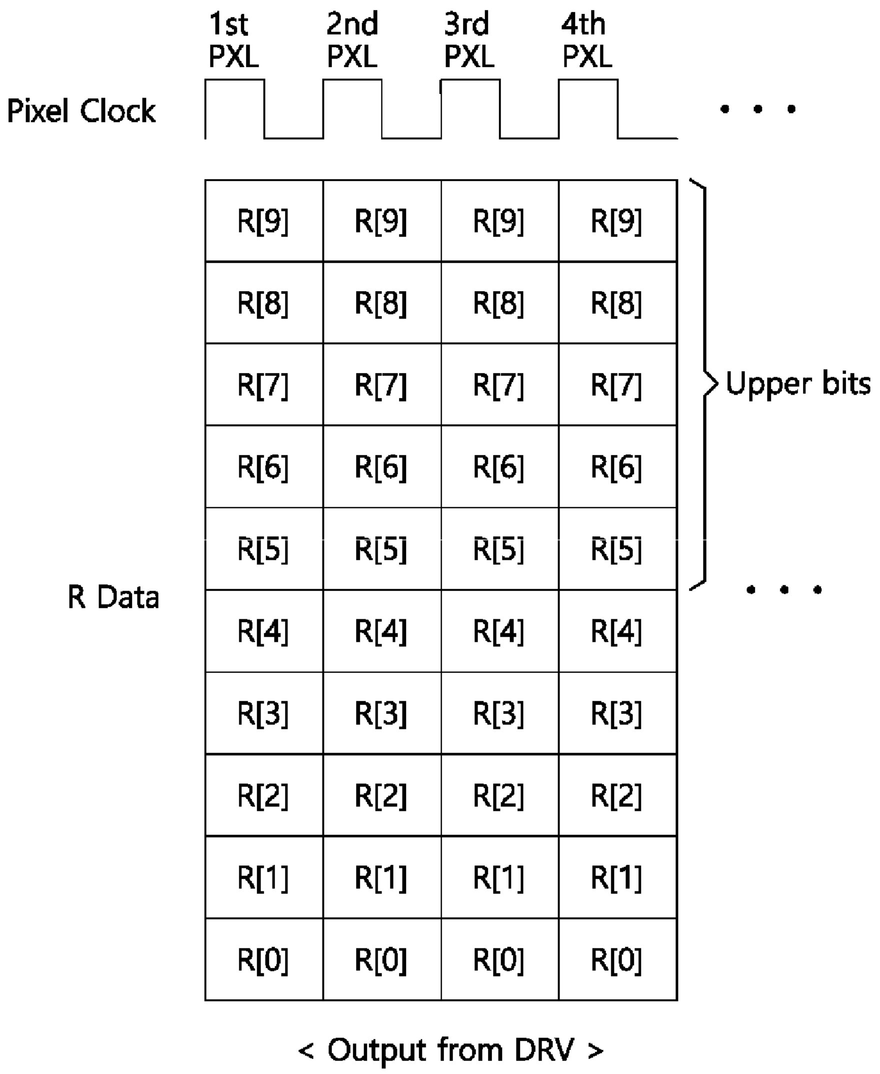
Figure 11A:
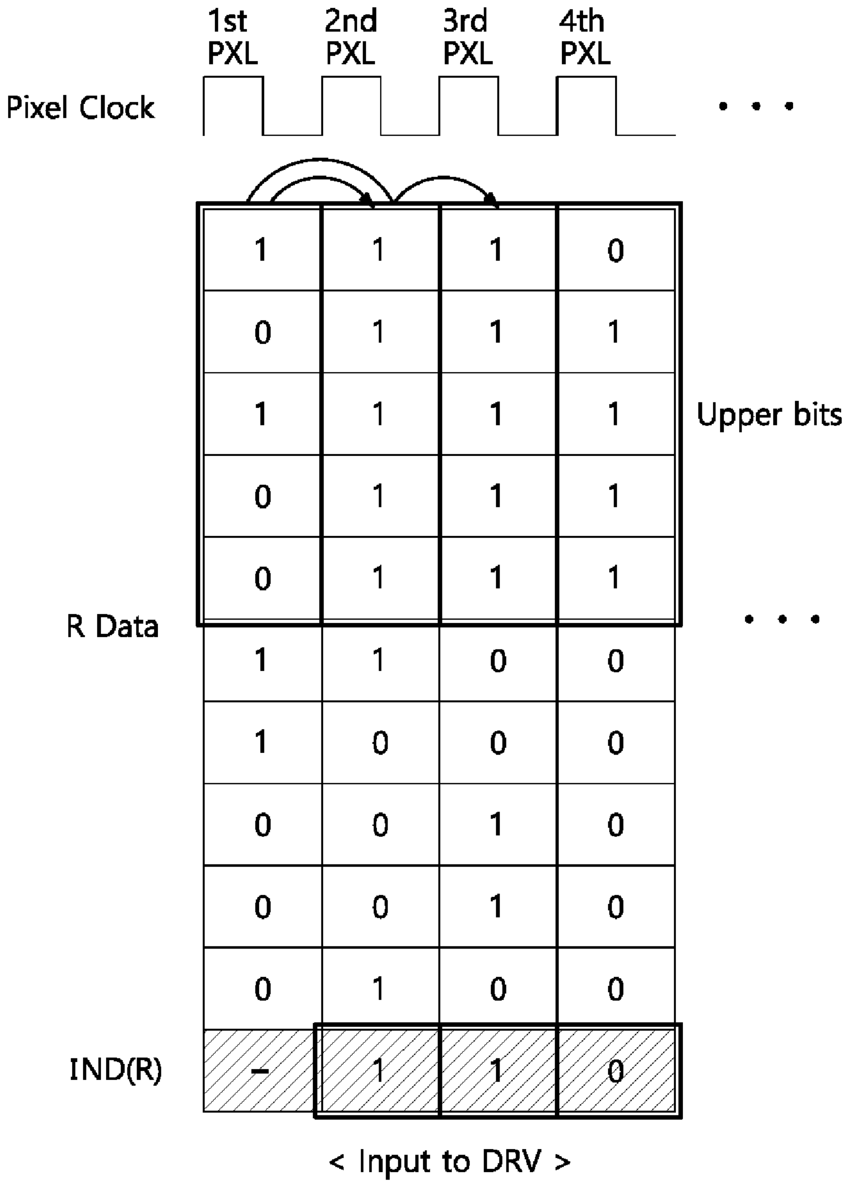
FIGS. 11A and 11B are diagrams illustrating a real example of an input and an output of each data recover according to an embodiment of the present disclosure.
Figure 11B:
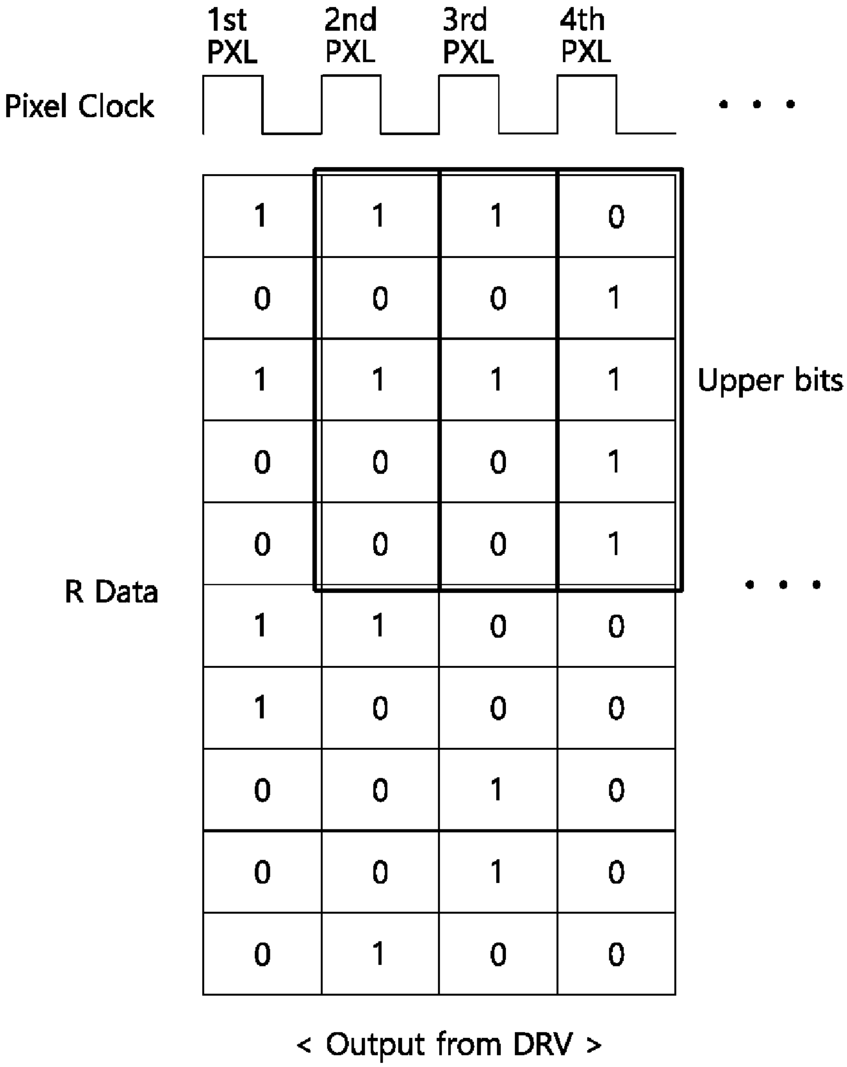

FIG. 5 is a diagram illustrating a configuration of each of a timing controller and a driver integrated circuit for processing 4-color data transfer packets to decrease the number of transitions of data. FIG. 6 is a diagram illustrating an operation of a data conversion circuit included in the timing controller of FIG. 5. FIGS. 7A and 7B are diagrams illustrating an input and an output of each data conversion circuit. FIGS. 8A and 8B are diagrams illustrating a real example of an input and an output of each data conversion circuit. FIG. 9 is a diagram illustrating an operation of a data recover included in the driver integrated circuit of FIG. 5. FIGS. 10A and 10B are diagrams illustrating an input and an output of each data recover. FIGS. 11A and 11B are diagrams illustrating a real example of an input and an output of each data recover.

Referring to FIG. 5, a timing controller TCON can encode data transfer packets each including 2-color image data among image data of a plurality of colors RGBW based on a pixel clock and can output the encoded data transfer packets to interface lines. The timing controller TCON can include a first reception circuit V-RX, a first memory MEM1, a data conversion circuit DTR, and a first transfer circuit EPI-TX.

The first reception circuit V-RX can be connected to a host system through a first interface (for example, Vx1) and can receive 4-color image data RGBW from the host system, based on the pixel clock.

The first memory MEM1 can store upper bits of each of the 4-color image data RGBW, which are received by the first reception circuit V-RX and are synchronized with the pixel clock.

The data conversion circuit DTR, as in FIG. 6, can perform a data processing operation by units of 2-color image data constituting a 1 data transfer packet. The 2-color image data can include first image data of a first color and second image data of a second color having opposite bit arrays in the same data transfer packet.

The data conversion circuit DTR can compare upper bits of 2-color image data, input from the first reception circuit V-RX according to an $n^{th}$ pixel clock, with upper bits of 2-color image data stored in the first memory MEM1 according to an n-lth pixel clock, by units of the same color and by units of bit in a one-to-one relationship.

The data conversion circuit DTR can differently process first image data and second image data under the specific condition, to reduce the number of transitions of data.

When logic values of upper bits are not changed as a result of comparison based on the first image data (e.g., the upper bits of the image data for two adjacent subpixels are the same), the data conversion circuit DTR can set first indication data of a 1 data transfer packet to '1' and can substitute the upper bits of the first image data from an original logic value into '1'. Furthermore, when the logic values of the upper bits are changed as the result of comparison based on the first image data (e.g., the upper bits the image data for two adjacent subpixels are different), the data conversion circuit DTR can set the first indication data of the 1 data transfer packet to '0' and can maintain the upper bits of the first image data as the original logic value (e.g., no conversion/encoding is performed in this situation).

For example, the data conversion circuit DTR can process first image data R(0) to R(9) of FIG. 7A based on the pixel clock to generate first image data R'(0) to R'(9) of FIG. 7B. In detail, the data conversion circuit DTR can compare upper bits of first image data, which is to be supplied to adjacent pixels, of pieces of first image data which are to be supplied to four pixels as in FIG. 8A, and thus, can generate first indication data and first image data each having a logic value as illustrated in FIG. 8B. Here, adjacent pixels can respectively correspond to a previous pixel clock and a current pixel clock adjacent to each other.

When logic values of upper bits are not changed as a result of comparison based on the second image data, the data conversion circuit DTR can set second indication data of the 1 data transfer packet to '1' and can substitute the upper bits of the second image data from an original logic value into '0'. Furthermore, when the logic values of the upper bits are changed as the result of comparison based on the second image data, the data conversion circuit DTR can set the second indication data of the 1 data transfer packet to '0' and can maintain the upper bits of the second image data as the original logic value.

The first transfer circuit EPI-TX can serially transfer 4-color image data RGBW, encoded by the data conversion circuit DTR, to interface lines by data transfer packet units.

The source driver SIC can receive data transfer packets through interface lines and can decode 1 data transfer packets according to the pixel clock to recover image data RGBW of a plurality of colors. The source driver SIC can include a second reception circuit EPI-RX, a second memory MEM2, a data recovery circuit DRV, a digital-to-analog converter DAC, and an output buffer BUF.

The second reception circuit EPI-RX can receive data transfer packets through the interface lines.

The data recovery circuit DRV, as in FIG. 9, can perform a data recovery operation by units of 2-color image data constituting the 1 data transfer packet. When indication data of each data transfer packet is '0', the data recovery circuit DRV can intactly recover the 2-color image data constituting the data transfer packet and can store a recovered result in the second memory MEM2 (e.g., no decoding/restoring is performed when indication data equals '0'). When the indication data of each data transfer packet is '1', the data recovery circuit DRV can substitute and recover logic values of upper bits of the 2-color image data constituting the data transfer packet into logic values of upper bits of image data stored in the second memory MEM2 (e.g., decoding/restoring is performed when indication data equals '1').

In other words, when first indication data of the 1 data transfer packet is '1', the data recovery circuit DRV can substitute and recover logic values of upper bits of first image data, corresponding to a current pixel clock, into logic values of upper bits of first image data corresponding to a previous pixel clock (e.g., use the same data previously stored in MEM2, since it is the same). On the other hand, when the first indication data of the 1 data transfer packet is '0', the data recovery circuit DRV can intactly recover the logic values of the upper bits of the first image data corresponding to the current pixel clock (e.g., do not use the data previously stored in MEM2, since the incoming image data is different than the data previously stored in MEM2).

For example, the data conversion circuit DTR can decode first image data R'(0) to R'(9) of FIG. 10A based on the pixel clock to recover the first image data R'(0) to R'(9) to first image data R(0) to R(9) of FIG. 10B. In detail, the data recovery circuit DRV can again substitute logic values of upper bits into logic values of upper bits of image data stored in the second memory with respect to image data, where indication data is '1', of pieces of first image data which are to be supplied to four pixels as illustrated in FIG. 11A, and thus, can recover the image data to first image data having original logic values as in FIG. 11B. The data recovery circuit DRV can intactly maintain logic values of upper bits with respect to image data, where indication data is '0', of pieces of first image data which are to be supplied to four pixels as illustrated in FIG. 11A, and thus, can recover the image data to the first image data as in FIG. 11B.

The data recovery circuit DRV can supply recovered 4-color image data RGBW to the digital-to-analog converter DAC.

The digital-to-analog converter DAC can convert the 4-color image data RGBW into data voltages. The 4-color image data RGBW can be output to data lines through the output buffer BUF.

According to the present disclosure, a bit array of image data of a first color and a bit array of image data of a second color can be constituted to be opposite to each other in a 1 data transfer packet, and thus, the number of transitions of data can be reduced (e.g., the least significant bits of the image data for two adjacent subpixels can be arranged at a center of a data transfer packet).

According to the present disclosure, when logic values of upper bits between image data of the same color to be supplied to adjacent pixels are the same, image data of the same color transferred in a lower priority can be processed so that the logic values of the upper bits have a first logic value '1' and a second logic value '0' which differ from an original logic value and can be transferred together with indication information about the performance or not of processing (e.g., whether or not decoding/restoring of data should be performed), thereby more decreasing the number of transitions of data.

As described above, in the present embodiment, the number of transitions of data when image data is transferred can decrease, thereby reducing EMI and power consumption.

The effects according to the present disclosure are not limited to the above examples, and other various effects can be included in the specification.

While the present disclosure has been particularly shown and described with reference to example embodiments thereof, it will be understood by those of ordinary skill in the art that various changes in form and details can be made therein without departing from the spirit and scope of the present disclosure as defined by the following claims.

What is claimed is:

1. A device for controlling a data interface of a display apparatus, the device comprising:

a timing controller configured to encode one data transfer packet including image data of a plurality of colors according to a pixel clock to output the one data transfer packet to an interface line; and a source driver configured to receive the one data transfer packet through the interface line and decode the one data transfer packet according to the pixel clock to recover the image data of the plurality of colors, wherein the image data of the plurality of colors includes first image data of a first color and second image data of a second color arranged between a first delimiter signal having a first logic value and a second delimiter signal having a second logic value different than the first logic value, wherein a most significant bit of the first image data is arranged closer to the first delimiter signal than a least significant bit of the first image data, wherein a most significant bit of the second image data is arranged closer to the second delimiter signal than a least significant bit of the second image data, wherein the timing controller is further configured to arrange first indication data and second indication data between the first delimiter signal and the first image data within the one data transfer packet, and wherein, when the first indication data has the first logic value, upper bits of the first image data all have the first logic value, and when the second indication data has the first logic value, upper bits of the second image data all have the second logic value.

2. The device of claim 1, wherein the least significant bit of the first image data and the least significant bit of the second image data are arranged next to each other within the one data transfer packet.

3. The device of claim 1, wherein the least significant bit of the first image data and the least significant bit of the second image data are arranged at a center of the one data transfer packet.

4. The device of claim 1, wherein, when the first indication data has the second logic value, the upper bits of the first image data have original logic values, and wherein, when the second indication data has the second logic value, the upper bits of the second image data have original logic values.

5. The device of claim 1, wherein the first indication data is arranged next to the most significant bit of the first image data, and wherein the second indication data is arranged next to the first delimiter signal.

6. The device of claim 1, wherein the timing controller is configured to:

when logic values of the upper bits of the first image data corresponding to a previous pixel clock are same as logic values of the upper bits of the first image data corresponding a current pixel clock, set the first indication data to the first logic value and substitute the upper bits of the first image data corresponding to the current pixel clock from original logic values with the first logic value, and when the logic values of the upper bits of the first image data corresponding to the previous pixel clock are different than the logic values of the upper bits of the first image data corresponding the current pixel clock, set the first indication data to the second logic value and maintain the upper bits of the first image data corresponding to the current pixel clock as the original logic values.

7. The device of claim 6, wherein the source driver is configured to:

when the first indication data has the first logic value, substitute the logic values of the upper bits of the first image data corresponding to the current pixel clock with the logic values of the upper bits of the first image data corresponding to the previous pixel clock, and when the first indication data has the second logic value, maintain the logic values of the upper bits of the first image data corresponding to the current pixel clock.

8. The device of claim 1, wherein the timing controller is configured to:

when logic values of the upper bits of the second image data corresponding to a previous pixel clock are same as logic values of the upper bits of the second image data corresponding to a current pixel clock, set the second indication data to the first logic value and substitute the upper bits of the second image data from original logic values with the second logic value, and when the logic values of the upper bits of the second image data corresponding to the previous pixel clock are different than the logic values of the upper bits of the second image data corresponding to the current pixel clock, set the second indication data to the second logic value and maintain the upper bits of the second image data as the original logic values.

9. The device of claim 8, wherein the source driver is configured to:

when the second indication data has the first logic value, substitute the logic values of the upper bits of the second image data corresponding to the current pixel clock with the logic values of the upper bits of the second image data corresponding to the previous pixel clock, and when the second indication data has the second logic value, maintain the logic values of the upper bits of the second image data corresponding to the current pixel clock.

* * * * *